UNITED STATES PATENT OFFICE.

GEORGE C. ROEDING, OF FRESNO, CALIFORNIA.

RAISIN-DRYING PROCESS.

1,245,031.    Specification of Letters Patent.    Patented Oct. 30, 1917.

No Drawing.    Application filed July 23, 1917.   Serial No. 182,306.

*To all whom it may concern:*

Be it known that I, GEORGE C. ROEDING, a citizen of the United States, residing at Fresno, in the county of Fresno and State of California, have invented new and useful Improvement in Raisin-Drying Processes, of which the following is a specification.

This invention relates to the curing and drying of raisins and pertains especially to the treatment of what is known in the trade as the Thompson seedless raisins, made from a seedless grape of that name, although of course the practice of the process is not limited to any particular variety of grape or raisin.

The object of the present invention is to do away with sulfuring, which is very detrimental to the flavor of the raisin, and is an objectionable process for other reasons as well.

The following is a brief outline of my process:

The Thompson seedless grapes are first dipped in a boiling solution of lye and olive oil. The two ingredients are made to combine and emulsify in water by a special process. After dipping, the grapes are dried on a new type of tray made of poultry netting. The drying of the raisins is carried on in a frame structure. It has a series of skeleton shelves placed 15 inches apart on which the trays rest. It is covered in cloth or canvas. The grapes on the trays are never exposed to the direct rays of the sun.

As a result of this special process a very superior raisin is produced of a very uniform color (amber) and of very delicate flavor, with an exceedingly supple skin.

The following is a suitable formula for the preparation of the emulsifying solution:

Take 8 lbs. of caustic soda; 1 gallon of olive oil and 3 gallons of water. Place in iron kettle and boil slowly for three hours, adding water occasionally during the course of cooking, if necessary.

Then take the emulsion and place it in another kettle, adding enough water to make five (5) gallons in all. Boil this slowly for about one hour or until it becomes a thick jelly.

In order to test the solubility of the emulsion, take a spoonful of the jelly and place it in cold water; if it dissolves without making suds, it is ready for use.

For each 100 gallons of water, use 4 lbs. of caustic soda and 1 quart of emulsion. The temperature of the tank in which this solution is placed should be maintained from 200 to 208° Fahrenheit. The grapes should not have less sugar than 22° by the saccharometer. They are immersed in the solution for a period of about 3 seconds. This may be varied according to the way the skins cut. The operator must take proper precautions not to dip any longer than it is necessary to show slight creases in the skin of the berries. This is readily determined by exposing them to the air for about 5 or 10 minutes when these creases are readily discerned. After the grapes are dipped in the solution they are then immersed in a tank holding cold water, to free them from any lye solution that may have adhered to the berries. From this tank they are taken to the covered shed and spread on poultry netting. The drying from this point on takes place entirely in the shade and no turning is necessary. It takes from 12 to 15 days before they are ready for the sweat box.

The advantages of this method are that the grapes dry heavier, the skins are much more pliable, and the berries have practically a uniform color without the plan that is usually resorted to of securing this color by sulfur. These advantages are due in applicant's opinion to the combination of results following from the drying in the shade; the lye treatment by which the grape skins are cracked to facilitate drying, supplemented by the preservative and textural qualifications of the oil and the use of poultry netting trays, the mesh of which is two to three inches in diameter so as to allow the clusters to hang through, whereby the circulation of air is permitted freely through the clusters.

Actual practice shows that the difference in weight between raisins treated under the old sulfuring sun-drying process and my process is an important point in favor of the latter. Even when sulfuring it takes 4 and ½ pounds of grapes to make 1 pound of dried, and when these grapes are not processed it takes 5 pounds of grapes to make one pound of dried raisins. By my method, it only takes 3½ pounds of grapes to make one pound of raisins.

It is understood that any suitable form of sun protection over the trays may be employed, the work usually being done under an open shed and usually in a very hot, dry climate such as characterizes raisin growing localities.

It is manifest that various changes in the proportions and character of the emulsion, or in the other steps of the process may be made without departing from the principle of the present invention.

Having thus described my invention what I claim and desire to secure by Letters Patent is—

1. The method of curing raisins by first dipping the grapes to be treated into an emulsion of lye and a vegetable oil, and then drying in a covered structure out of contact with the sun's rays, and upon open mesh trays whereby the air may circulate freely through the grape clusters.

2. The method of curing raisins which consists in dipping the grapes to be treated in an emulsion containing lye and olive oil, removing the excess of lye solution, and then spreading on poultry netting and drying in the shade.

3. The method of curing raisins which comprehends treating them with a solution to crack the skins to facilitate drying, and at the same time to render the skin flexible when the raisin is dried, and then exposing the raisins on netting, allowing the clusters to hang through the meshes of the netting and the air to circulate through the clusters, the clusters remaining upon the netting until dried.

4. The method of drying grapes which consists in dipping the grapes in a boiling solution of lye and olive oil and drying the grapes in the shade.

5. The method of drying grapes which consists in dipping the grapes in a boiling solution of lye and olive oil, drying the grapes in the shade, the clusters of grapes during the drying being suspended upon the reticulated support.

6. The method of curing raisins which comprehends the following steps: preparing an emulsion of caustic soda, olive oil and water in the proportions of approximately 8 pounds of caustic soda to one gallon of olive oil and 3 gallons of water, boiling the mixture slowly, adding water enough to make approximately 5 gallons in all, and then boiling to a thick jelly, this jelly solution being soluble in water without making suds; next diluting the gelatinous mixture to form a solution in the proportions of approximately 100 gallons of water, 4 pounds of caustic soda and 1 quart of emulsion; next bringing the admixture last obtained to a temperature of approximately the boiling point; next immersing the grapes to be treated in the hot solution for approximately 3 seconds; next removing the grapes from the solution and freeing them from any lye solution that may adhere thereto, and finally drying the same.

7. The method of curing raisins which comprehends the following steps: preparing an emulsion of caustic soda, olive oil and water in the proportions of approximately 8 pounds of caustic soda to one gallon of olive oil and 3 gallons of water, boiling the mixture slowly, adding water enough to make approximately 5 gallons in all, and then boiling to a thick jelly, this jelly solution being soluble in water without making suds; next, diluting the gelatinous mixture to form a solution in the proportions of approximately 100 gallons of water, 4 pounds of caustic soda and 1 quart of emulsion; next bringing the admixture last obtained to a temperature of approximately the boiling point; next immersing the grapes to be treated in the hot solution for approximately 3 seconds; next removing the grapes from the solution and freeing them from any lye solution that may adhere thereto and finally drying the same upon poultry netting and in the shade.

In testimony whereof I have hereunto set my hand in the presence of two subscribing witnesses.

GEORGE C. ROEDING.

Witnesses:
ARVE HOISHOLT,
W. W. HEALEY.